May 5, 1970 C. A. WILMS 3,510,170

POWER UNIT FOR OSCILLATING TUNNELING MACHINE

Filed July 10, 1968 8 Sheets-Sheet 1

INVENTOR.
CARL A. WILMS
BY Beehler & Arant
ATTORNEYS

INVENTOR.
CARL A. WILMS

FIG. 5.

INVENTOR.
CARL A. WILMS

INVENTOR.
CARL A. WILMS
BY Beehler & Arant
ATTORNEYS

FIG. 9.

May 5, 1970  C. A. WILMS  3,510,170
POWER UNIT FOR OSCILLATING TUNNELING MACHINE
Filed July 10, 1968  8 Sheets-Sheet 8

INVENTOR.
CARL A. WILMS
BY Beehler & Arant
ATTORNEYS

United States Patent Office 3,510,170
Patented May 5, 1970

---

3,510,170
POWER UNIT FOR OSCILLATING TUNNELING MACHINE
Carl A. Wilms, La Habra, Calif., assignor to Smith Industries International, Inc., Santa Fe Springs, Calif., a corporation of California
Filed July 10, 1968, Ser. No. 743,798
Int. Cl. E21d 23/08; E21c 1/10
U.S. Cl. 299—33                    18 Claims

ABSTRACT OF THE DISCLOSURE

A tunneling machine having a shell, an interior frame structure, and a pair of beams attached to the frame structure for supporting a removable power unit. The power unit, including a drive shaft support frame having longitudinal flanges for supporting it from the beams, upper and lower drive shafts disposed lengthwise of the machine and rotatably carried on the drive shaft frame, left and right crank arms on each of the drive shafts, an upper pair of hydraulic rams coupled between the crank arms of the upper drive shaft and the flange regions of the drive shaft frame, and a lower pair of hydraulic rams coupled between the crank arms of the lower drive shaft and the flange regions of the drive shaft frame. Pie-shaped upper and lower cutters attached to the forward ends of the upper and lower drive shafts, respectively, to provide an oscillating tunneling machine. The upper drive shaft having its rearward end inclined upwardly so that the upper cutter is inclined forwardly relative to the lower cutter.

BACKGROUND OF THE INVENTION

Reference is made to U.S. Pat. No. 3,355,215 issued Nov. 28, 1967 entitled "Oscillating Tunneling Machine." That patent discloses a tunneling machine having two separate cutting heads each of which cuts its own individual portion of the tunnel face, and each of which is driven by its own separate drive means so as to permit individual control of the cutting action on the different portions of the tunnel face; each cutting head being driven in an oscillating action by a hydraulic linear actuator which is disposed parallel to the plane of oscillation of the cutting head and coupled between the frame of the machine and the cutting head.

The present invention provides an improvement in the oscillating tunneling machine disclosed in the referenced patent. One object of the present invention is to make the manufacture of oscillating tunneling machines simpler and more economical.

Accordingly, the present invention provides a power unit for an oscillating tunneling machine which is manufactured separately, as an integral unit, and is then removably mounted in the shell and frame structure to make a complete and operative machine. When a subsequent job involves cutting a tunnel of a different diameter the same power unit may be removed from the original shell and relocated in another shell of a different diameter.

As shown in Pat. No. 3,355,215 there is in some instances an advantage in arranging the forward end of the machine so that it inclines in a forwardly direction, rather than being strictly vertical. This arrangement of the machine is particularly advantageous when tunneling in soft formation. A further modification which has proved to be advantageous is arranging the lower cutting head so that it reciprocates in an essentially vertical plane of oscillation, while inclining the upper cutting head in a forwardly direction so that its plane of oscillation is approximately twenty-five degrees from the vertical.

According to the present invention it has been discovered that the arrangement of the machine in which the upper cutting head is inclined forwardly relative to the lower cutting head also lends itself advantageously to the creation of an integral power unit which may be manufactured as a standard item according to fixed specifications.

PREFERRED EMBODIMENT

Figure 1:
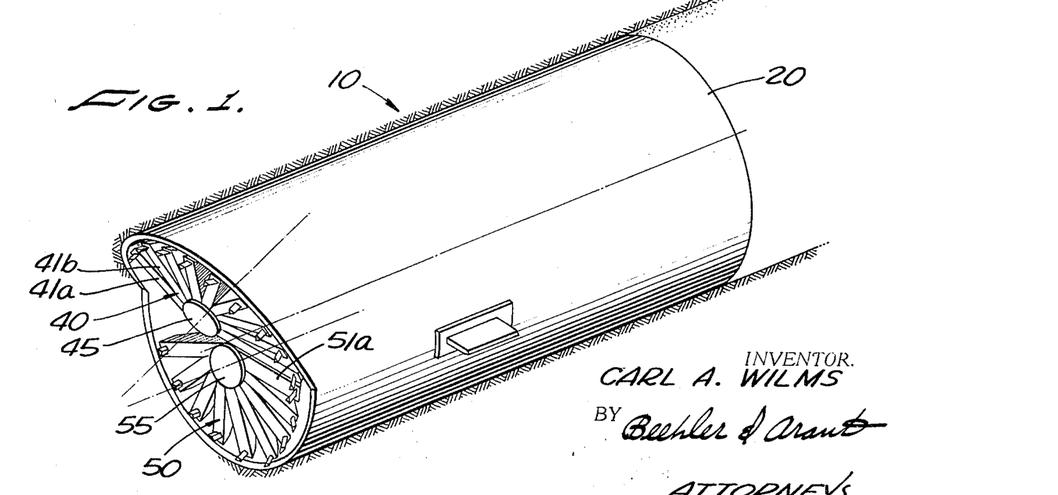
FIG. 1 is a perspective view of a tunneling machine embodying a presently preferred form of the invention.
Figure 2:
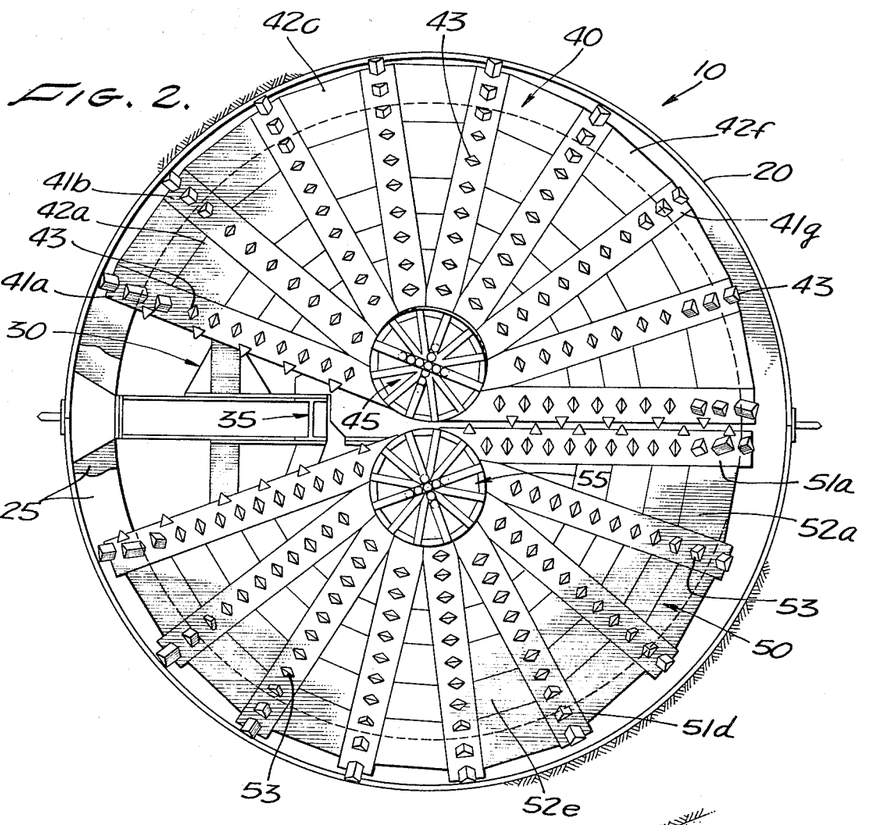
FIG. 2 is a front end elevation view of the tunneling machine of FIG. 1.

As best seen in FIGURES 1 and 2, tunneling machine 10 has a generally cylindrical outer shell 20, and projecting from the machine at the forward end of shell 20 are a pie-shaped upper cutter 40 and a pie-shaped lower cutter 50. The upper and lower cutters reciprocate or oscillate across the upper and lower halves, respectively, of the tunnel face, in the manner generally described in Pat. No. 3,355,215.

Figure 3:
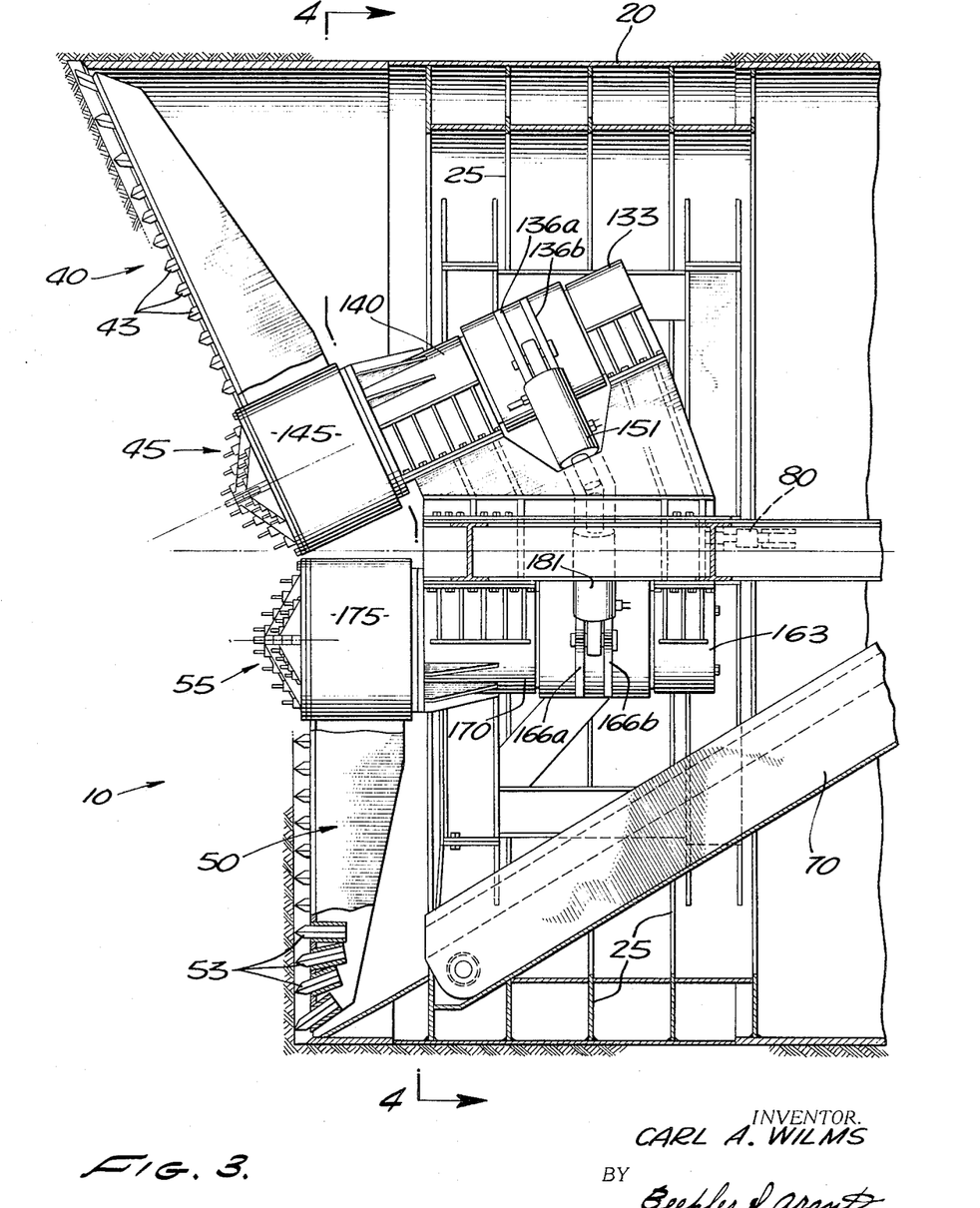
FIG. 3 is a side elevational view, partly in cross-section, of the forward end of the machine.
Figure 4:
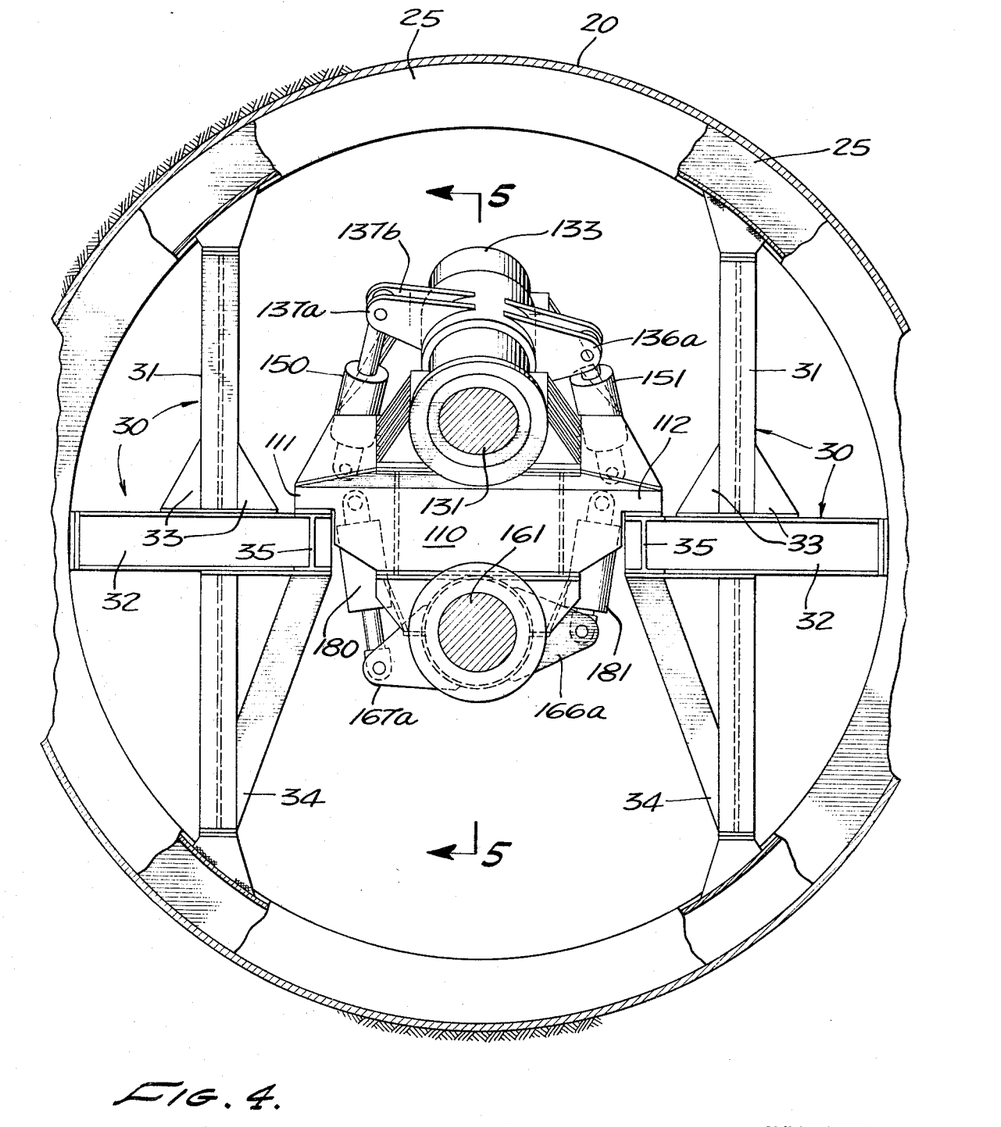
FIG. 4 is a transverse cross-sectional elevation view taken on the line 4—4 of FIG. 3.

A plurality of circumferential ribs 25 are welded inside the shell 20 (FIGS. 2, 3, and 4). An inner frame structure 30 is attached to the ribs 25 on each side of the machine (FIGURE 4), and includes vertical posts 31, lateral beams 32, gusset plates 33, and angle beams 34. The purpose of the frame assemblies 30 is to support a spaced pair of horizontal beams 35 which extend longitudinally of the shell 20, and whose function in turn is to support the removable power unit. Beams 35 (FIGURES 4 and 6) are preferably I beams.

Figure 5:
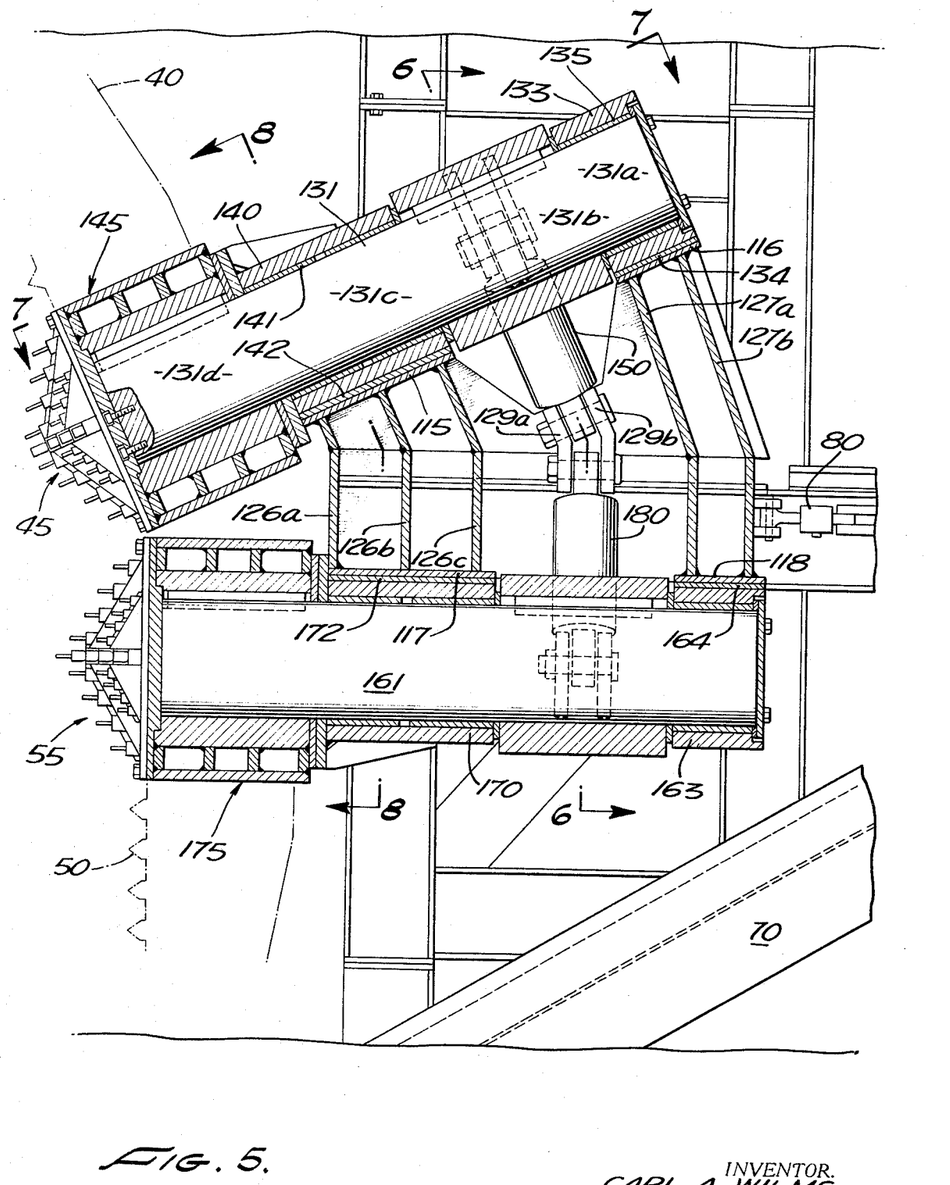
FIG. 5 is a longitudinal cross-sectional view of the power unit taken on the line 5—5 of FIG. 4.
Figure 6:
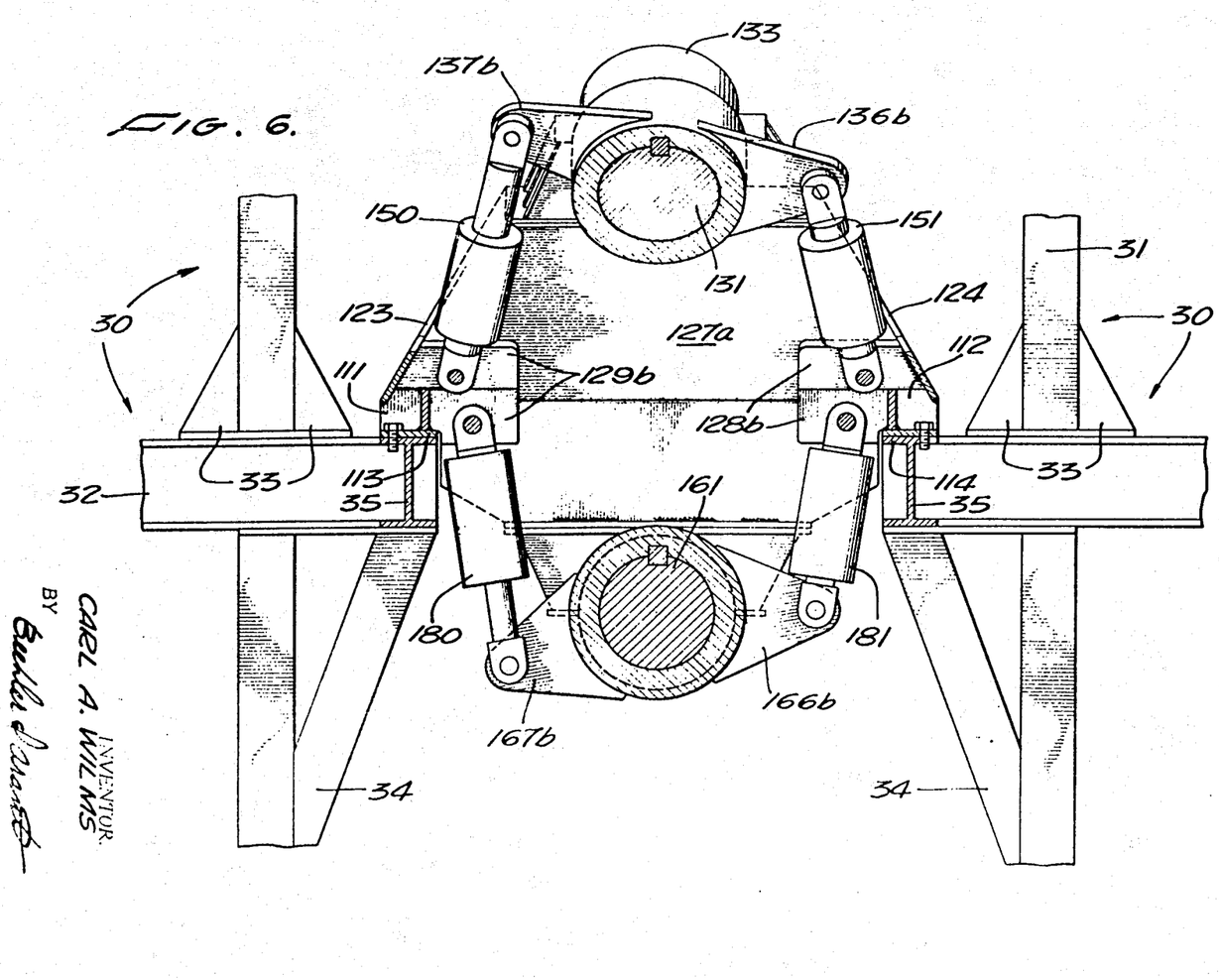
FIG. 6 is a cross-sectional view of the power unit and its mounting support taken on the line 6—6 of FIG. 5.
Figure 8:
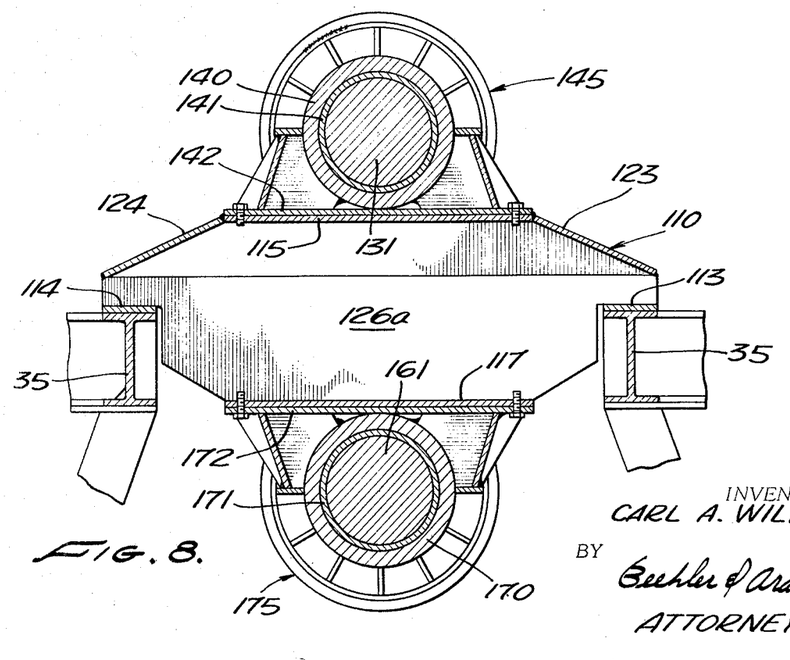
FIG. 8 is a cross-sectional view taken on the line 8—8 of FIG. 5.
Figure 9:
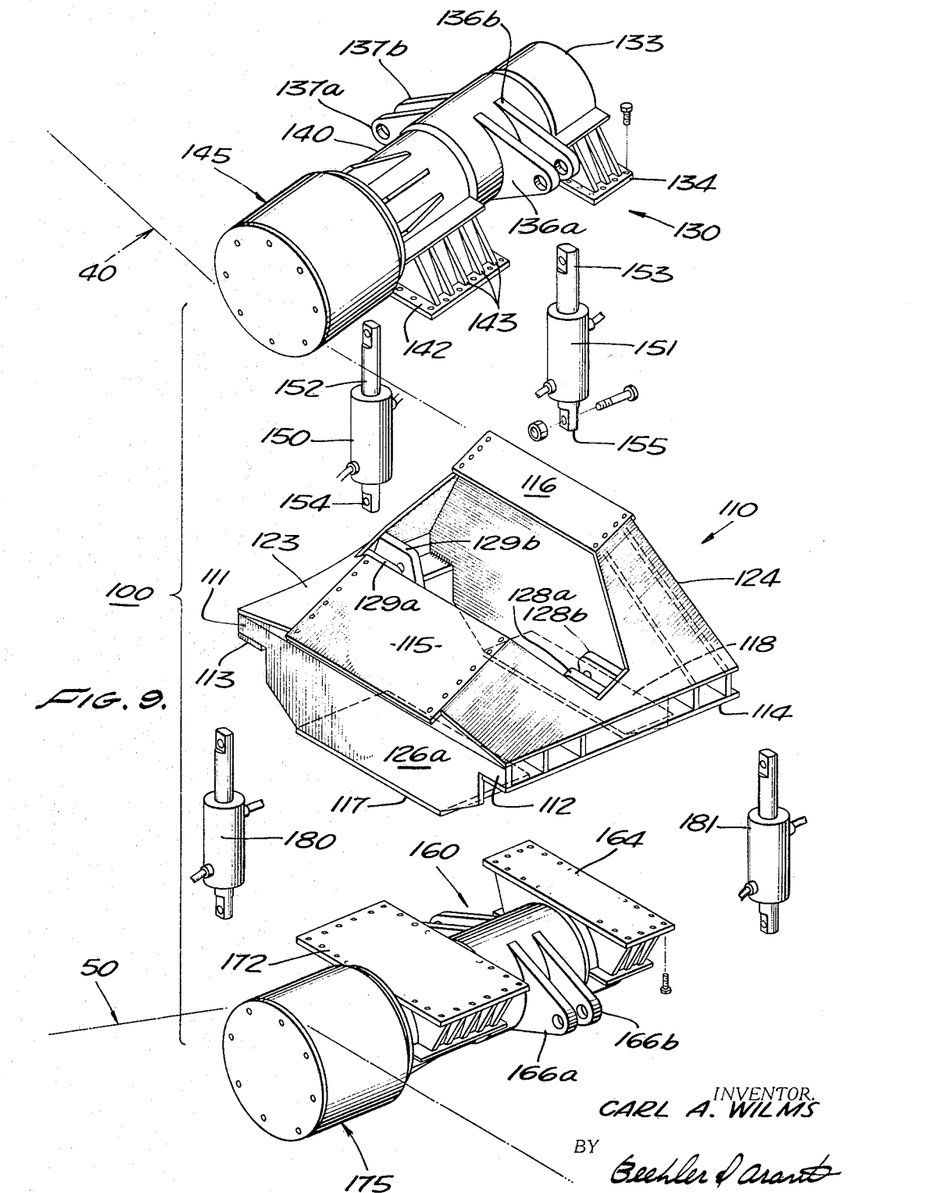
FIG. 9 is an exploded perspective view of the power unit.

The removable power unit 100 is shown in assembled form in FIGURE 4, in longitudinal cross-section in FIGURE 5, in transverse cross-section in FIGURE 6, and in exploded perspective form in FIGURE 9. As best seen in FIGURE 9 the power unit 100 includes a drive shaft support frame 110 which is of a generally wedge-shaped configuration. An upper drive shaft assembly 130 is fastened on top of the frame 110 while a lower drive shaft assembly 160 is fastened beneath it. The support frame 110 has longitudinally extending flanges 111, 112 formed on its side edges, having flat under plates 113, 114, and it is these under plates of the flanges which rest upon the I beams 35 (FIGURES 4, 6, 8).

The upper drive shaft assembly 130 and the lower drive shaft assembly 160 are identical except for one difference which will be pointed out subsequently, hence the same reference characters are used to identify their various parts except for a difference of 30 in the value of the reference numerals. A detailed description of the upper assembly 130 will therefore serve to describe the lower assembly as well.

Figure 7:
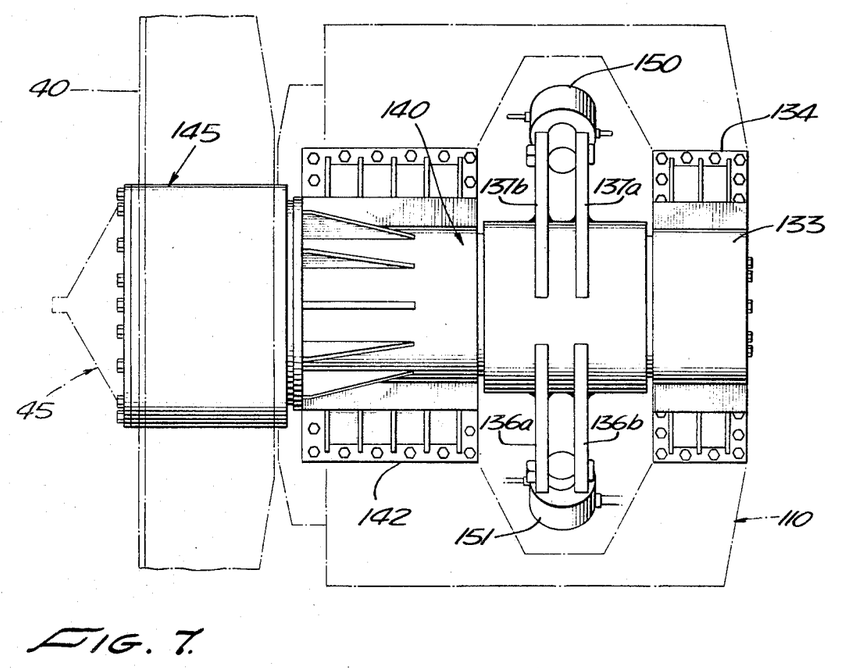
FIG. 7 is a top plan view of the upper drive shaft assembly.

Upper drive shaft assembly 130 is best understood with reference to FIGS. 5, 7 and 9. The upper drive shaft 131 has a rear bearing section 131a at its rearward end; the next section immediately forward is the crank arm section 131b; then near its forward end it has a forward bearing section 131c; and the forward end itself constitutes a cutter support section 131d. The rear bearing housing 133 receives a rear bearing 135, and a horizontal rear support plate 134 is attached to the housing 133 and in turn provides the means for supporting housing 133 from the upper surface of the wedge-shaped frame 110. In its crank arm support section 131b the upper drive shaft 131 has a pair of laterally extending left crank arms 136a, 136b welded thereto, and also has a pair of laterally extending right crank arms 137a, 137b welded thereto. As best seen in FIGURES 4 and 6 the common plane of the left and right crank arms 136 and 137 of the upper drive shaft is located above the longitudinal axis of the shaft. In a symmetrical but opposite arrangement, the crank arms 166, 167 of the lower drive shaft have a common plane which is located below the longitudinal axis of the lower drive shaft. This constitutes the one difference between the upper and lower drive shaft assemblies previously referred to.

In the upper drive shaft assembly 130 a housing 140 receives the forward bearing 141. A flat plate 142 is attached to the housing 140 by means of a plurality of parallel intermediate plates 143, and flat plate 142 provides the means for attaching the upper drive shaft assembly 130 to the wedge-shaped support frame 110 at the forward end thereof. A cylindrical cage 145 is keyed to the forward end of the upper drive shaft 131 and provides the means for attaching the upper cutter 40 thereto. The structure of cage 145 is shown in detail in FIGS. 5, 10 and 11.

A pair of upper hydraulic rams 150, 151 have their upper ends 152, 153 coupled to the crank arms 137, 136, respectively. The lower ends 154, 155 of the rams are coupled to the drive shaft support frame 110 in the region of the flanges 111, 112, respectively.

The structure of support frame 110 will now be described in somewhat greater detail. The upper surface of the frame is provided at its forward end by a flat plate 115 and at its rearward end by a plate 116, to which the plates 142, 134 of the upper drive shaft assembly are respectively attached. The lower surface of frame 110 is defined by plate 117 at its forward end and plate 118 at its rearward end, these plates being attached to plates 172, 164, respectively, of the lower drive shaft assembly, when the power unit is in its fully assembled condition. A large gap between plates 115, 116 permits insertion of the lower ends of hydraulic rams 150, 151 therebetween. A large gap between plates 117, 118 provides working space for the upper ends of the rams 180, 181. Sloping side plates 123, 124 are attached under the ends of the plates 115, 116, and extend downwardly therefrom. The lower longitudinal edges of plates 123, 124, together with the horizontal under plates 113, 114, provide the longitudinal flanges 111, 112 as previously described. The internal structure of frame 110 is completed by a generally vertical set of forward plates 126a, 126b, 126c (FIG. 5) and a similar set of rearward plates 127a, 127b. In the working area for the hydraulic rams there are provided a pair of thicker stub plates 128a, 128b on the left hand side of the support frame 110; and 129a, 129b on the right hand side. As best seen in FIGURE 5 these stub plates are bent at their vertical center so that the upper ends thereof are inclined at an angle of approximately twenty-five degrees relative to the lower ends thereof. The upper ends of plates 129a, 129b are coupled to the lower end 154 of ram 150; the lower ends of the same plates are coupled to upper end 182 of ram 180. In similar fashion the upper ends of plates 128a, 128b are coupled to the lower end 155 of ram 151, while their lower ends are coupled to the upper end 183 of ram 181.

The axis of the upper drive shaft is parallel to plates 142, 134. In frame 110 the plane of plates 115, 116 forms an angle of approximately twenty-five degrees with the plane of plates 117, 118. It will therefore be seen that the upper drive shaft 131 and lower drive shaft 161 are supported in a generally horizontal relationship but with the rearward end of drive shaft 131 being elevated, so that the angle between the longitudinal axes of the two drive shafts is approximately twenty-five degrees. Each drive shaft is supported both by its rearward bearing and its forward bearing; is driven in a reciprocating or oscillating motion by its crank arms, with power being derived from the associated hydraulic rams; and is in turn operable to impart an oscillating or reciprocating action to its associated cutter.

Another part of the tunneling machine is the conventional conveyor 70, shown in FIGS. 3 and 5.

As shown in FIGS. 1 and 2 the upper cutter 40 has a generally pie-shaped configuration, being attached at its apex to the support cage 145 of the upper drive shaft assembly. The cutter 40 includes a number of radial arms 41a . . . 41i, on which digging teeth 43 are mounted. Connecting plates 42a . . . 42h are connected between adjacent pairs of the radial arms, but these connecting plates may be removed when a hard formation is encountered by the tunneling machine.

In addition to the upper cutter 40 there is a central cutter 45 of generally circular configuration which is attached to the forward flat end of the mounting cage 145 of the upper drive shaft assembly. As best seen in FIG. 3 this circular cutter 45 has a generally conical configuration. The cutter 45 fills a gap that would otherwise be present in the structure of the upper cutter 40.

The lower cutter 50 is of the same configuration as upper cutter 40, having radial arms 51a . . . 51i. The teeth, identical to 43, are designated 53. The connecting plates 52a . . . 52h for the radial arms are, as in the upper cutter, removable when desired. A central circular cutter 55 is attached to the forward end of the cage 175 of the lower drive shaft assembly.

As best seen in FIG. 2 the upper cutter 40 occupies approximately one hunderd sixty degrees of the upper half of the tunneling machine, thus permitting only about twenty degrees of reciprocating or oscillating movement to take place. As a result, the power stroke required from the hydraulic rams 150, 151 is a very short stroke. The same arrangement exists relative to the lower cutter 50 and rams 180, 181. It is here pointed out that FIGS. 2 through 8 of the drawings are scale drawings of the actual construction of the preferred embodiment of the invention, hence from an examination of the drawings the available working space for the hydraulic rams can be easily determined. Suffice it to say that despite the very compact construction of power unit 100 the rams are able to extend and retract a sufficient distance to accomplish the twenty degree reciprocation of the cutting heads, and more if that should be required.

Another feature of the invention is the provision of means for retracting the power unit when the cutters for any reason become jammed. This retraction is made possible by the longitudinal sliding relationship between flange plates 113, 114 and the I beams 35. A coupler 80 is attached to the rearward end of frame 110 and to a separate power source, not shown, for accomplishing such selective retraction.

Figure 10:
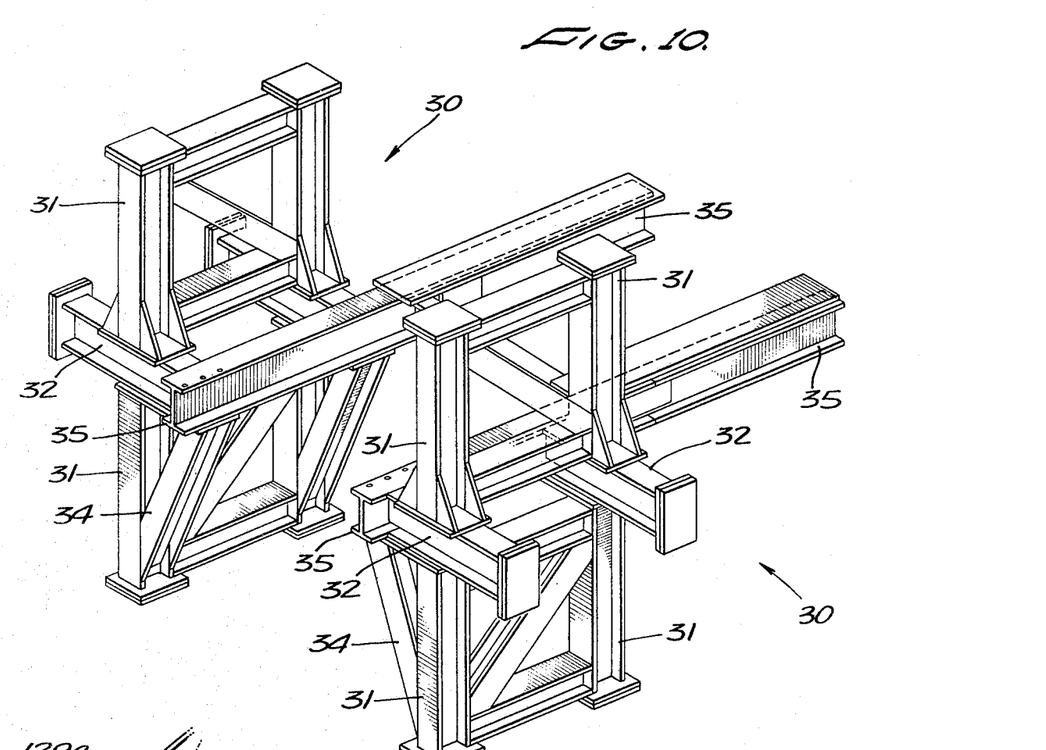
FIG. 10 is a perspective view of the interior frame structure of the machine before the power unit is installed.
Figure 11:
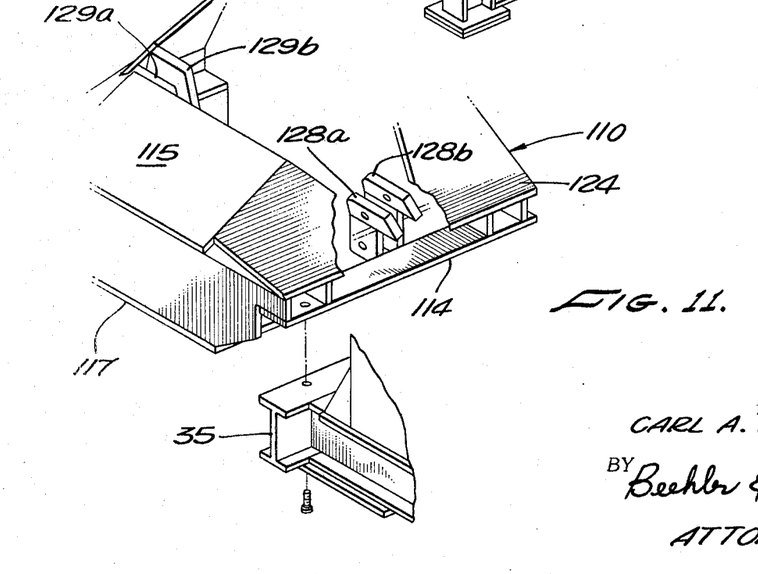
FIG. 11 is a perspective detail view of the power unit and its supporting means.

An advantage of the invention is that the power unit may be removed from the machine, and the remaining structure as shown in FIG. 10 may, if desired, be used as a hand digging shield. In that usage it is convenient to support a walking platform from the I beams 35.

It will be understood that if the upper and lower cutters are to operate in the same plane the upper and lower drive shafts are then arranged precisely parallel to each other. The upper and lower parts of the ram attachment means 128, 129 may then be staggered in the longitudinal direction to permit sufficient stroke room for the rams.

Having described the invention, what is claimed as new in support of Letters Patent is:

1. A power unit for an oscillating tunneling machine of the type having a main frame and separate upper and lower cutters disposed at the forward end of said frame and adapted to reciprocatingly sweep across respective sector-shaped areas of the tunnel face, said power unit comprising, in combination:

an upper drive shaft and a lower drive shaft;

a drive shaft support frame adapted to rotatably support said upper and lower drive shafts in generally horizontal, generally parallel positions;

means for removably supporting said drive shaft support frame from the main frame so that said upper drive shaft is above the longitudinal axis of the machine and said lower drive shaft is below said longitudinal axis;

means for removably attaching the upper cutter to the forward end of said upper drive shaft;

means for removably attaching the lower cutter to the forward end of said lower drive shaft;

each of said drive shafts having laterally projecting left and right crank arms;

said drive shaft support frame having separate left and right laterally extending ram support means provided thereon;

a generally vertically disposed upper pair of hydraulic rams having their lower ends coupled to said left and and right crank arms, respectively, of said upper drive shaft and having their lower ends coupled to said left and right ram support means, respectively; and a generally vertically disposed lower pair of hydraulic rams having their lower ends couplde to said left and right crank arms, respectively, of said lower drive shaft and having their upper ends coupled to said left and right ram support means, respectively.

2. A power unit as claimed in claim 1 wherein at least one of said drive shafts is provided with a rear bearing support at its rearward end and a separate forward bearing support near its forward end; said crank arms being attached to said drive shaft intermediate to said bearing supports; and said cutter attachment means being located forwardly of said forward bearing support.

3. A power unit as claimed in claim 1 wherein the common plane of said left and right crank arms of said upper drive shaft is located above the longitudinal axis of said upper drive shaft, and the common plane of said left and right crank arms of said lower drive shaft is located below the longitudinal axis of said lower drive shaft.

4. A power unit as claimed in claim 1 adapted for receiving cutters each of which includes a generally pie-shaped cutting frame and a separate, smaller, generally circular central cutting frame; each of said drive shafts having a cylindrical forward end portion terminating in a flat forward end face; said attachment means for each of said drive shafts including means for attaching the apex of the pie-shaped cutting frame to the cylindrical surface of said drive shaft forward end portion, and separate means for attaching the central cutting frame to said flat forward end face.

5. A power unit as claimed in claim 1 wherein said means for removably supporting said drive shaft support frame includes a longitudinally extending lateral flange provided on each side thereof, the outer edge of each said flange being located outboard of the associated ram support means, the under surfaces of said flange outer edges being adapted to rest on a pair of beams attached to the tunneling machine frame.

6. A power unit as claimed in claim 1 wherein the rearward end of said upper drive shaft is raised relative to the forward end thereof, said upper pair of hydraulic rams having their upper ends inclined forwardly so that said rams occupy a plane that is substantially perpendicular to the longitudinal axis of said upper drive shaft; whereby the upper cutter reciprocates in a plane that is forwardly inclined relative to the plane of reciprocation of the lower cutter.

7. A power unit as claimed in claim 6 wherein said lower drive shaft is horizontal and the lower cutter reciprocates in a vertical plane.

8. A power unit as claimed in claim 6 wherein said upper drive shaft is inclined approximately 25 degrees relative to said lower drive shaft.

9. A power unit for a tunneling machine comprising, in combination:

a generally wedge-shaped drive shaft support frame having longitudinally extending lateral flanges on its side edges;

upper and lower drive shafts, each having laterally projecting left and right crank arms;

means rotatably supporting said drive shafts in longitudinally extending positions from the upper and lower sides, respectively, of said support frame, so that the longitudinal axes of said drive shafts are disposed at an angle of approximately 25 degrees relative to each other;

an upper pair of hydraulic rams having their upper ends coupled to said left and right crank arms, respectively, of said upper drive shaft and having their lower ends coupled to said support frame in the region of said flanges; and a lower pair of hydraulic rams having their lower ends coupled to said left and right crank arms, respectively, of said lower drive shaft and having their upper ends coupled to said support frame in the region of said flanges.

10. A power unit as claimed in claim 9 wherein the common plane of said left and right crank arms of said upper drive shaft is located above the longitudinal axis of said upper drive shaft, and the common plane of said left and right crank arms of said lower drive shaft is located below the longitudinal axis of said lower drive shaft.

11. A power unit for an oscillating tunneling machine of the type having a main frame which is generally in the form of a cylindrical shell, and also having separate upper and lower pie-shaped cutters disposed at the forward end of the machine and adapted to reciprocatingly sweep across respective sector-shaped areas of the tunnel face, said power unit comprising:

a drive shaft support frame adapted for removable attachment to the main frame in a central and forwardly position therein;

vertically spaced upper and lower drive shafts rotatably supported from said support frame and each adapted for attachment of the corresponding cutter thereto, the upper drive shaft having its rearward end inclined upwardly so that the upper cutter is inclined forwardly; and two pairs of generally vertically extending hydraulic rams for reciprocatingly driving said upper and lower cutters, respectively, the rams of each pair co-acting between said support frame and the corresponding shaft and not being directly connected to the main frame.

12. A power unit as claimed in claim 11 wherein said upper drive shaft is inclined approximately twenty-five degrees relative to the longitudinal axis of the main frame.

13. A power unit as claimed in claim 11 wherein the rams of each said ram pair are located on opposing lateral sides of the shaft driven thereby.

14. A power unit as claimed in claim 12 wherein each of said drive shafts has laterally projecting left and right crank arms, said support frame has laterally extending left and right ram support means, and each of said rams is coupled between the corresponding crank arm and the correspondnig ram support means.

15. A power unit as claimed in claim 13 wherein said support frame is elongated, the frontal portion including at least one bearing for rotatably supporting each of said shafts, and said crank arms being on the rearward portions of said shafts.

16. A power unit as claimed in claim 13 wherein said upper drive shaft is inclined approximately twenty-five degrees relative to the longitudinal axis of the main frame.

17. A power unit as claimed in claim 14 wherein said upper drive shaft is inclined approximately twenty-five degrees relative to the longitudinal axis of the main frame.

18. A power unit as claimed in claim 15 wherein said upper drive shaft is inclined aproximately twenty-five degrees relative to the longitudinal axis of the main frame.

References Cited

UNITED STATES PATENTS

| | | | |
|---|---|---|---|
| 2,149,345 | 3/39 | Hunsaker | 61—84 X |
| 2,898,742 | 8/59 | Robbins | 299—33 X |
| 3,350,889 | 11/67 | Sturm | 299—33 X |
| 3,404,920 | 10/68 | Tabor | 299—33 X |
| 3,411,826 | 11/68 | Wallers et al. | 299—33 X |

ERNEST R. PURSER, Primary Examiner

U.S. Cl. X.R.

299—57